3,224,891
COMPOSITIONS FOR PAPER COATING CONTAINING CYANOETHYLATED AMYLACEOUS PRODUCTS
Thomas E. Yeates, Merle E. Carr, and Charles L. Mehltretter, Peoria, Ill., assignors to the United States of America as represented by the Secretary of Agriculture
No Drawing. Filed Nov. 9, 1962, Ser. No. 236,746
3 Claims. (Cl. 106—213)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes in hereby granted to the Government of the United States of America.

This invention relates to improved coating compositions for paper, and more particularly to compositions containing cyanoethylated amylaceous products.

The main object of the present invention is to provide coating compositions for paper which will allow the use of lower solids content of the compositions and still maintain desired flow and spread properties and to provide coatings of greatly increased pick resistance. Another object of the present invention is to provide cyanoethyl ethers of dextrins and cyanoethyl ethers of acid modified starch whose aqueous dispersions or pastes have desired rheological properties, high clarity and highly efficient bonding properties for use as adhesives in paper coating compositions.

Another object of the present invention is to provide a process for the production of coated paper with the above mentioned cyanoethylated amylaceous products.

The cyanoethylation of starch to produce ethers of starch is well known. In British Patent 808,290 starch is reacted with acrylonitrile under alkaline conditions to provide ungelatinized starch ethers that are insoluble in water. The insoluble nature of these starch ethers, however, greatly limits their usefulness. In U.S. Patent No. 2,316,128 water soluble cyanoethyl ethers of starch have been prepared which have been gelatinized during etherification. These products being in the non-granule state are viscous solutions containing high concentrations of dissolved salts formed by neutralization of the alkali used in the reaction. Purification of such products is difficult and costly. In U.S. Patent No. 2,965,632 cyanoethyl ethers of starch were prepared in granule form having a degree of substitution (D.S.) of cyanoethyl groups in starch of from about 0.1 to about 1.0 (10 to 100 cyanoethyl groups per 100 anhydroglucose units of starch). While these products are readily pasted or gelatinized by cooking in water they have not been used or suggested for use as colloidal binders for clay in pigment coating of paper. In fact, just the opposite is shown in Belgian Patent No. 554,348 which describes the preparation of cyanoethyl ethers of starch for use as flocculants or precipitants for clay in aqueous suspension. Paper coating compositions containing clay and cyanoethylated starch derivatives would therefore not be expected to be colloidally homogeneous and stable because of precipitation of the clay from the composition and would be expected to have little or no utility for application to paper.

Surprisingly we have found that paper coating compositions remain homogeneous and stable when the cyanoethylated amylaceous products of the invention are used as adhesives or binders for the clay. Presumably the low degree of substitution (less than 16 cyanoethyl groups per 100 anhydroglucose units of the starch) eliminates the expected coagulation effect of the cyanoethyl moiety and at the same time increases the strength of the binder.

Coating compositions which generally comprise a pigment such as clay and a binder for the pigment which also causes adherence of the coating composition to the surface of the paper must have appropriate fluidity or rheological properties for spreading on paper at the medium to high speeds used in industrial paper technology. Water dispersed binders used in coating compositions should have desirable flow properties, clarity, and adhesive strength, and should produce coatings when admixed with pigment and applied to paper that are homogeneous and greatly strengthen the surface of the paper as measured by the Dennison wax test, the conventional surface strength test of the paper industry in which pick resistance of the surface coating is determined.

The recent increases in mailing costs for periodicals has increased the need by publishers for lower weight coatings that have strong surface strengths and that can be used effectively on paper to provide publication paper having lower basis weights. The major part of the weight of publication grade paper is contributed by the clay or other pigments in coating compositions and it would be obvious to reduce the solids content in such coating compositions to obtain paper of lower basis weight. However, when this is done with presently available low cost starch-derived coating adhesives, the viscosity of the coating composition is reduced unfavorably for coating purposes and a considerable increase in the concentration of the adhesive is required to maintain viscosity and high surface strength which is costly. This also increases paper weight to some extent, and may reduce brightness.

The relatively simple aqueous system containing clay and a binder or adhesive such as starch still is one of the cheapest paper coating compositions and is used to the greatest extent. The efficiency of this system has been improved over the years by the development and use of modified starch binders. The principal types of modified starches used in paper coatings are dextrins, oxidized starches and enzyme converted starches. By contrast, low cost, thin-boiling starches, produced by acid hydrolysis of aqueous slurries of starch, have little utility as adhesives in compositions for paper coating.

We have now discovered ways to utilize these thin-boiling starches as binders for paper coating compositions by low-cost chemical conversion to cyanoethyl ethers. We have found that low extents of cyanoethylation to a degree of substitution (D.S.) of from 0.01 to 0.09 (1 to 9 cyanoethyl groups per 100 anhydroglucose units of the thin-boiling starch) produces cyanoethyl ethers of the amylaceous raw material having remarkable binding efficiency with resulting increase in coating strength. Furthermore, we have discovered that the cyanoethylated products so produced are very efficient binders for coating compositions of reduced pigment or clay content and thereby lower the basis weight of the coated paper while simultaneously achieving desired viscosity and increased coating strength as determined by the Dennison wax test. In fact, paper coating compositions comprising our low-cost cyanoethylated starch derivatives produce superior paper coating strengths with compositions having a solids concentration range of about 40 to about 60 percent using essentially the same ratio of binder to clay, and have the greatest commercial value in the lower solids content coating compositions and paper treated therewith.

In carrying out the invention, an aqueous slurry of granular (ungelatinized) acid modified starch is reacted with acrylonitrile in the presence of an alkaline catalyst with or without the addition of sodium sulfate. The reaction temperature is preferably maintained between 25° C. and 50° C. but the reaction is not limited to this temperature range. After about 6 to 17 hours of reaction the granular product is separated by filtration, washed with water and dried. The white product is obtained in a yield of 95 to 98 percent based on the acid modified starch used and the acrylonitrile added is reacted to the extent of from 76 to 90 percent. However, the extent of reaction of acrylonitrile with amylaceous raw material is dependent on the combinations of time, temperature and concentration of reactants while maintaining non-gelatinizing conditions and thereby allows considerable variation of reaction conditions. In fact the starch in the mineral acid aqueous slurry after appropriate hydrolysis may be reacted directly with acrylonitrile without intermediate isolation. The aqueous acid slurry is made alkaline by careful addition of caustic soda solution and the required amount of acrylonitrile is then added for reaction under the conditions of the invention. A low cost product is thereby obtained. Also, as an equivalent method, raw unmodified starch may be reacted with acrylonitrile under the conditions of the invention and then hydrolyzed by acid to produce the acid modified cyanoethylated starch product of the invention. Cooked pastes of these products at 25 percent solids concentration were fair to excellent in clarity and had little tendency to gel or set-back on cooling and standing for 24 hours at room temperature, which is in marked contrast to the parent acid modified starch.

The invention is applicable to all varieties of starch such as that of corn, wheat, tapioca, waxy sorghum, waxy maize, and rice, high amylose corn starch, amylose and the like. Further the invention is applicable to modified starches such as oxidized starches, starch ethers, starch esters, dextrins, and the like. It is obvious that the cyanoethylated dextrins of the invention are more costly to prepare than the cyanoethylated acid modified starches. However, we have prepared cyanoethylated dextrins having a D.S. of 0.006 to 0.16 and have found them to be excellent binders in clay coating compositions.

Starch and many of its derivatives such as acid modified starch and the like are commercially available in the granule form. However, such products are readily gelatinized by heating in water or strongly alkaline solutions. The cyanoethylated starch derivatives may be prepared in either the granule or gelatinized form and both are suitable for our invention.

The paper coating compositions of our invention are prepared by methods that are well known to the paper industry. Coating grade clay is mixed with water and a dispersing agent and to this is added the cyanoethylated starch paste which preferably has been gelatinized by cooking at about 95° C. for about 10 to about 25 minutes at a 25 weight percent concentration in water before mixing with the clay slip. However, concentrations of the adhesives may vary considerably from this depending upon the coating solids concentration desired. The final aqueous coating compositions contain from 40 percent to 60 percent total coating solids, comprising 12 to 15 parts of cyanoethylated amylaceous adhesive to 100 parts of clay. The viscosities of such coating compositions are practical for use with most of the coating procedures of the paper industry.

The following examples which are typical will illustrate the practice of our invention.

EXAMPLE 1

Preparation of ungelatinized cyanoethylated thin-boiling starches of low degrees of substitution.

*General procedure*

182 grams (162 g. dry basis; 1 mole) of a commercial thin-boiling (acid modified) starch containing 11.2 percent moisture was slurried in 325 ml. of solution containing 54 g. (0.38 mole) of sodium sulfate and 0.22 g. (0.055 mole) of sodium hydroxide. The acrylonitrile was then added and the reaction conducted in a closed system with agitation at 25 to 27° C. After appropriate reaction time, the product was neutralized to pH 6.0 with hydrochloric acid, filtered, washed free of salts and dried. The white products were isolated in granule form.

The conditions and results of five cyanoethylation experiments are shown in Table I.

TABLE I

| Experiment number | Acrylonitrile, grams | Reaction time (hrs.) | Yield (D.B.),[1] grams | Product, D.S.[2] |
|---|---|---|---|---|
| 1 | 5.30 | 17 | 160 | 0.088 |
| 2 | 2.65 | 17 | 162 | 0.045 |
| 3 | 2.00 | 16 | 160 | 0.033 |
| 4 | 2.00 | 6 | 160 | 0.026 |
| 5 | 1.32 | 6 | 160 | 0.019 |

[1] Dry basis.
[2] Calculated from nitrogen content.

Adhesive dispersions for coating composition use were prepared with four of the cyanoethylated starches of Table I at 25 percent solids concentration. This was done by stirring 15 g. (dry basis) of the particular cyanoethylated starch in 45 g. of water at 95° C. for 25 minutes at 250 r.p.m. After cooling to 30° C., Brookfield viscosity (30 r.p.m.), pH of dispersion, and clarity were determined as shown in Table II. Dispersions of the cyanoethylated starches (except D.S. 0.019) on standing for 24 hours showed very little set-back. Such physical measurements were also determined on a 25 precent solids aqueous dispersion of the commercial thin-boiling starch before cyanoethylation, which is the control in Table II. The control showed appreciable set-back on standing.

TABLE II

| Cyanoethylated thin-boiling starch, D.S. | 25 percent aqueous dispersion | | |
|---|---|---|---|
| | Brookfield viscosity, cps. | pH | Clarity |
| 0.088 | 1,700 | 7.6 | Excellent. |
| 0.045 | 1,000 | 7.3 | Good. |
| 0.033 | 4,000 | 7.7 | Do. |
| 0.019 | 16,400 | 7.5 | Poor. |
| Control | 16,000 | 5 | Poor opaque. |

EXAMPLE 2

Preparation of ungelatinized cyanoethylated corn starch of low degree of substitution followed by acid hydrolysis.

369 grams (324 g. D.B.; 2 moles) of raw corn starch of 12.19 percent moisture content was slurried in a solution containing 108 g. (0.76 mole) sodium sulfate and 0.44 g. (0.11 mole) of sodium hydroxide in 650 ml. water. Then 11.7 g. (0.22 mole) of acrylonitrile was added and the reaction conducted at 25 to 27° C. in a closed flask with continuous mechanical agitation. After stirring for 16 hours the product was neutralized to pH 6 with hydrochloric acid, filtered, washed free of salts and air dried. The recovered white granular product weighted 326 g. (D.B.) and had a D.S. of 0.09.

A slurry of 25 g. (D.B.) of the above cyanoethylated corn starch in 25 ml. of water was adjusted to pH 1.5 with sulfuric acid and then added over a 10-minute period to 48 ml. of boiling water at pH 1.5 in a flask equipped with a reflux condenser and mechanical stirrer. The paste was very fluid after 5 minutes of additional heating and stirring at 95 to 100° C. The 25 percent concentration paste was cooled to 30° C. and pH adjusted to 6 with sodium hydroxide. Brookfield viscosity at 30° C. (30 r.p.m.) was 250 cps. Very little set-back was noted on standing for 24 hours at room temperature.

EXAMPLE 3

The procedure of Example 1 was followed using 178 g. (162 g. D.B.; 1 mole) of a commercial dextrin containing 8.6 percent moisture. Experimental conditions and results are shown in Table III for the preparation of 6 granular products of decreasing degree of substitution.

TABLE III

| Expt. No. | Acrylonitrile, grams | Reaction time, hrs. | Yield (D.B.) grams | Product, D.S.[1] |
|---|---|---|---|---|
| 1 | 10.60 | 16 | 142 | 0.16 |
| 2 | 5.30 | 16 | 153 | 0.08 |
| 3 | 2.65 | 16 | 153 | 0.036 |
| 4 | 1.32 | 17 | 154 | 0.019 |
| 5 | 1.32 | 6 | 154 | 0.015 |
| 6 | 0.67 | 4 | 155 | 0.006 |

[1] Calculated from nitrogen content.

Aqueous dispersions of the product were prepared at 25 percent solids concentration for coating composition use by the procedure in Example 1. Brookfield viscosity (30 r.p.m.) at 30° C., pH, and clarity of the dispersions were measured as shown in Table IV. The control was a 25-percent aqueous dispersion of the commercial dextrin.

TABLE IV

| Cyanoethylated dextrin, D.S. | 25 percent aqueous dispersion | | |
|---|---|---|---|
| | Brookfield viscosity, cps. | pH | Clarity |
| 0.16 | 17,900 | 6.2 | Excellent. |
| 0.08 | 2,100 | 7.1 | Do. |
| 0.036 | 1,600 | 7.3 | Very good. |
| 0.019 | 1,600 | 7.3 | Fairly good. |
| 0.006 | 1,660 | 7.6 | Poor-opaque. |
| Control | 9,500 | 6.4 | Do. |

EXAMPLE 4

100 g. of dry coating grade clay were mixed with 41 g. of water and 4 ml. of 5 percent sodium hexametaphosphate solution. The mixture was uniformly dispersed by stirring mechanically for 10 minutes. To this dispersion was added a cyanoethylated thin-boiling starch adhesive dispersion prepared as described in Example 1, with appropriate amounts of water to obtain 40 percent and 50 percent solids content coating compositions having 15 percent by weight of adhesive based on the weight of clay.

A series of 60 percent solids coating compositions was prepared by mixing 100 g. of dry coating clay with 28 g. of water and adding 4 ml. of 5 percent sodium hexametaphosphate solution. After uniform dispersion by mechanical mixing for 10 minutes all of the respective 25 percent adhesive dispersions of Example 1 (60 g.) were added and well mixed to obtain respective paper coating compositions.

Each coating composition was applied to the same quality of paper stock at 27° C. to a thickness of 0.75 mil (wet) on one side of the paper. Samples of the coated paper were air dried, conditioned 24 hours at 73° F. and 50 percent relative humidity and tested for wax pick by the Dennison wax test described in Standard Procedure T-459-M-45 of the Technical Association of the Pulp and Paper Industry. Coating viscosities of the compositions were measured with a Brookfield viscometer (30 r.p.m.) at 27° C. and at 57° C. and then applied to paper at the respective temperatures. The viscosities at 57° C. were somewhat lower but adequate and the pick values of the paper coated at 57° C. were approximately the same as those found for paper coated at 27° C.

Data obtained are shown in Table V for coating compositions containing 15 percent cyanoethylated thin-boiling starch adhesive on the weight of clay and for paper coated with such coating compositions. The coating composition control was made with the parent thin-boiling starch under the same conditions of solids content. pH of the coating compositons was 6.0 to 6.2.

TABLE V

| Cyanoethylated thin-boiling starch, D.S. | Coating solids | | | | Dennison wax number |
|---|---|---|---|---|---|
| | Percent | Viscosity (27° C.), cps. | | | |
| | | Initial | 1 hr. | 24 hrs. | |
| 0.088 | 40 | 336 | 880 | 1,376 | 6.5 (B.S.)[1] |
| | 50 | 1,380 | 3,500 | 4,500 | 8.0 (B.S.) |
| | 60 | 5,300 | 10,000 | 11,400 | 8.0 (B.S.) |
| 0.033 | 40 | 348 | 688 | 1,076 | 6.0 |
| | 50 | 2,800 | 4,500 | 7,600 | 8.0 (B.S.) |
| Control | 50 | 500 | 560 | 692 | <2 |
| | 60 | 4,000 | 4,780 | | <2 |
| Ten-O-film [2] No. 6781 | 40 | 590 | 770 | | 2.5 |
| | 50 | 3,300 | 5,400 | | 8 (B.S.) |

[1] B.S. represents bodystock split (splitting of the paper without coating pick).
[2] A commercial hydroxyethylated starch used as a binder in paper coating compositions.

The coating compositions are thixotropic. The viscosity values in Table V for 1 hour and 24 hours were obtained on the unstirred mixtures. However, when these mixtures were stirred before measurement, the viscosity values returned to approximately the initial values.

In order to obtain a Dennison wax number of 8 (B.S.) for paper coated with the control 50 percent coating solids composition, the use of 27 percent of the control adhesive based on the weight of clay is required and would not be economically feasible.

It is seen from Table V that good pick resistance is achieved over a coating solids range of 40 to 60 percent with a constant adhesive content of the coating composition of 15 percent based on the weight of clay.

The significance of these data is that paper coated with as low as 40 percent coating solids in coating compositions containing only 15 percent adhesive solids (based on the weight of the clay) yields low basis weight coated paper of desired coating strength as indicated by the high pick value. This is in marked contrast to the results obtained with the commercial coating adhesive listed in Table V. Furthermore, large changes in the percentage of coating solids at constant adhesive to clay ratio provide coatings having effective wax pick resistance.

In Table VI it is shown that as low as 12 percent cyanoethylated thin-boiling starch adhesive (based on weight of clay) may be used in 60 percent coating solids compositions to obtain good pick resistance. In these cases the adhesive was prepared at 25 percent solids concentration as in Example 1 but using 12 g. (D.B.) of adhesive in 36 g. of water. The control was the parent thin-boiling starch.

TABLE VI

| Cyanoethylated thin-boiling starch, D.S. | Percent[1] adhesive on weight of clay | Coating solids, percent | Coating composition viscosity (27° C.),cps. | Dennison wax number |
|---|---|---|---|---|
| 0.088 | 12 | 50 | 1,180 | 3.5 |
|  | 12 | 60 | 4,900 | 6.0 |
| 0.045 | 12 | 50 | 1,000 | 3.0 |
|  | 12 | 60 | 4,000 | 5.5 |
| Control | 12 | 50 | 230 | <2.0 |
|  | 12 | 60 | 2,300 | <2.0 |

[1] Parts by weight of adhesive per 100 parts by weight of clay (dry basis).

EXAMPLE 5

Coating compositions were prepared with the acid hydrolyzed cyanoethylated starch of Example 2 using the procedure of Example 4 for 50 and 60 percent coating solids. The adhesive dispersions contained 15.4 g. (D.B.) of adhesive in 61.6 g. of dispersion and 14.0 g. (D.B.) of adhesive in 56 g. of dispersion.

The evaluation data for the coating composition and for the coated paper are shown in Table VII.

TABLE VII

| Viscosity of adhesive dispersion of 25% solids, cps. | Coating solids | | | Adhesive Percent on weight of clay | Dennison wax number |
|---|---|---|---|---|---|
|  | Percent | Viscosity (27° C.) cps. | | | |
|  |  | Initial | 4 hrs. | | |
| 250 | 50 | 345 | 415 | 15.4 | 6.0 |
|  | 60 | 3,100 | 3,740 | 14.0 | 7.0 |
| Control[1] | 50 | 184 | 380 | 14.0 | <2 |
|  | 60 | 1,340 | 2,150 | 14.0 | <2 |

[1] Acid hydrolyzed starch.

These data show that coated paper of good strength can be obtained with low cost acid hydrolyzed cyanoethylated starch under viscosity conditions and concentrations of adhesive and pigment of interest to the paper industry. Acid hydrolyzed starch without cyanoethylation has practically no value as an adhesive in coating compositions.

EXAMPLE 6

Coating compositions of 40, 50, and 60 percent coating solid contents were prepared with the cyanoethylated dextrins of Example 3 using the procedures of Example 4. The adhesive dispersions were prepared at 25 percent concentration as in Example 1. However, both 15 percent and 12 percent adhesive based on dry weight of clay (15 parts and 12 parts of adhesive per 100 parts of dry clay) were used in the coating compositions.

The data in Table VIII indicate the favorable characteristics of the cyanoethylated dextrin aqueous dispersions (25 percent solids) for use in coating compositions with pigments such as clay. The control is the parent commercial dextrin.

TABLE VIII

| Cyanoethylated dextrin, D.S. | Brookfield viscosity, cps. (27° C., 30 r.p.m.) | pH | Clarity |
|---|---|---|---|
| 0.16 | 17,900 | 6.2 | Excellent. |
| 0.08 | 2,100 | 7.1 | Do. |
| 0.036 | 1,300 | 7.5 | Very good. |
| 0.019 | 1,600 | 7.3 | Fairly good. |
| 0.006 | 16,600 | 7.6 | Poor. |
| Control | 9,500 | 6.4 | Do. |

The products showed very little set-back on standing for several days at room temperature.

The data in Table IX illustrate the effectiveness of the cyanoethylated dextrin adhesives of low D.S. when used at 15 percent adhesive concentration (based on dry weight of clay) in 40 percent and 50 percent coating solids compositions, for achieving desired coating strength in pigment coated paper. The control was the parent dextrin.

In order to achieve a Dennison wax number of 6 with the parent dextrin at 50 percent coating solids, 20 percent adhesive based on the weight of clay would be required.

TABLE IX

| Cyanoethylated dextrin, D.S. | Percent | Coating solids | | | Dennison wax number |
|---|---|---|---|---|---|
|  |  | Viscosity (27° C.), cps. | | | |
|  |  | Initial | 1 hr. | 24 hrs. | |
| 0.16 | 50 | 3,300 | 5,300 | 6,000 | 6.0 |
| 0.08 | 40 | 255 | 620 | 958 | 6.0 |
|  | 50 | 1,400 | 3,000 | 4,500 | 6.0 |
| 0.019 | 40 | 276 | 596 | 1,016 | 5.5 |
|  | 50 | 1,700 | 3,400 | 5,200 | 6.0 |
| 0.006 | 50 | 2,000 | 3,300 |  | 6.0 |
| Control | 50 | 530 | 640 | 1,000 | <2 |
| Claro No. 5591[1] | 40 | 125 | 127 |  | 2.0 |
|  | 50 | 716 | 760 |  | 5.5 |

[1] A commercial hypochlorite oxidized starch used as an adhesive in coating compositions.

These coating compositions (Table IX) exhibited about the same viscosity characteristics as those of Table V in Example 3.

The data in Table IX show the value of these adhesives for obtaining low basis weight coated paper having good pick resistance at 40 percent coating solids and using 15 percent adhesive. The commercial product was not an effective coating adhesive at this level of coating solids.

The following Table X shows the beneficial effect of 12 percent cyanoethylated dextrin (based on weight of clay) on pick resistance using coating compositions of 60 percent total solids. Paper coated with 50 percent coating solids gave poor pick resistance at the 12 percent adhesive level (based on weight of clay). However increasing the adhesive solids to 15 percent in the lower solids coating compositions (Table IX) as well as in the higher solids coating compositions improved the pick resistance. The control was the parent dextrin.

TABLE X

| Cyanoethylated dextrin, D.S. | Percent adhesive on weight of clay | Coating solids, percent | Coating composition viscosity (27° C.), cps. | Dennison wax number |
|---|---|---|---|---|
| 0.16 | 12 | 50 | 2,500 | 2.0 |
|  | 12 | 60 | 9,100 | 6.0 |
|  | 15 | 60 | 11,840 | 7.0 |
| 0.08 | 12 | 50 | 1,000 | 2.0 |
|  | 12 | 60 | 4,200 | 6.0 |
| 0.036 | 12 | 50 | 960 | 2.5 |
|  | 12 | 60 | 3,800 | 6.0 |
|  | 15 | 50 | 1,250 | 6.5 |
| 0.019 | 12 | 60 | 5,200 | 5.5 |
| 0.006 | 12 | 50 | 1,200 | 2.0 |
| Control | 12 | 50 | 530 | <2.0 |
|  | 12 | 60 | 3,300 | 2.0 |

An extremely significant fact in connection with our invention is that the use of low cost cyanoethylated amylaceous products of low degrees of substitution in paper coating compositions affords a means of obtaining low basis weight coated paper having good strength or pick resistance as herein described and at the same time the coating compositions have viscosity characteristics suitable for use in present day paper coating processes.

Variations in materials, proportions, and procedures will be apparent to those skilled in the art without departing from the scope of the invention as limited by the following claims.

We claim:

1. An aqueous dispersion for coating paper, said dispersion containing from 40 percent to 60 percent total solids based on the weight of the dispersion, said solids consisting of clay pigment and from 12 parts to 15 parts based on 100 parts by weight of the clay pigment of a cyanoethylated amylaceous adhesive, said adhesive being a cyanoethylated ether of a member selected from the group consisting of dextrin and acid modified starch, said ether being characterized by containing from 1 to 9 cyanoethyl groups per 100 anhydroglucose units.

2. An aqueous dispersion according to claim 1 wherein the ether is an acid modified starch containing 9 cyanoethyl groups per 100 anhydroglucose units.

3. Paper coated with a dispersion as defined in claim 1.

References Cited by the Examiner
UNITED STATES PATENTS

| | | | |
|---|---|---|---|
| 2,837,438 | 6/1958 | Sample | 106—213 |
| 2,892,731 | 6/1959 | Claxton | 106—214 |

ALEXANDER H. BRODMERKEL, *Primary Examiner.*

D. J. ARNOLD, *Assistant Examiner.*